(12) United States Patent
Kato et al.

(10) Patent No.: US 8,366,226 B2
(45) Date of Patent: Feb. 5, 2013

(54) DATA GENERATION APPARATUS, INKJET RECORDING APPARATUS, AND DATA GENERATION METHOD

(75) Inventors: Ryota Kato, Yokohama (JP); Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 12/797,481

(22) Filed: Jun. 9, 2010

(65) Prior Publication Data

US 2010/0315458 A1 Dec. 16, 2010

(30) Foreign Application Priority Data

Jun. 15, 2009 (JP) ................................ 2009-142537

(51) Int. Cl.
*B41J 29/38* (2006.01)
(52) U.S. Cl. .......................................................... 347/14
(58) Field of Classification Search ...................... 347/14
See application file for complete search history.

(56) References Cited

U.S. PATENT DOCUMENTS

| | | | |
|---|---|---|---|
| 2002/0021319 A1* | 2/2002 | Kawatoko et al. | 347/15 |
| 2008/0158280 A1 | 7/2008 | Imai | |
| 2010/0033525 A1* | 2/2010 | Kunihiro | 347/12 |
| 2010/0328387 A1* | 12/2010 | Nakazawa et al. | 347/14 |

FOREIGN PATENT DOCUMENTS

JP 2008-162095 A 7/2008

* cited by examiner

*Primary Examiner* — Laura Martin
(74) *Attorney, Agent, or Firm* — Canon U.S.A., Inc. IP Division

(57) ABSTRACT

An apparatus for generating data used to apply a plurality of inks similar in color and different in color material density, including a first ink and a second ink higher in color material density than the first ink, onto a pixel area on a recording medium with a recording head includes a generation unit configured to generate the data in such a way that out of a plurality of pixels constituting the pixel area, a number of pixels onto which dots of the first ink are applied in an overlapped manner is greater than a number of pixels onto which dots of the second ink are applied in the overlapped manner.

11 Claims, 17 Drawing Sheets

FIG.6
Lv0 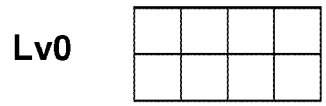
Lv1 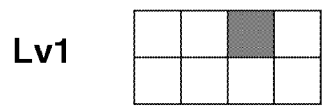
Lv2 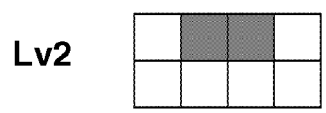
Lv3 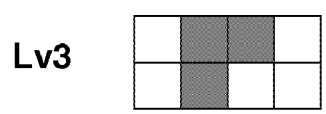
Lv4 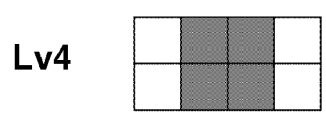
Lv5 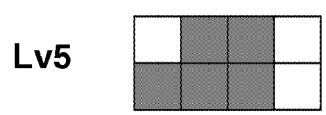
Lv6 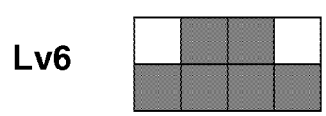
Lv7 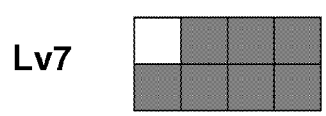
Lv8 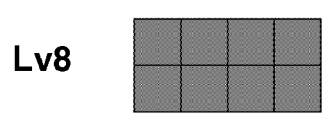

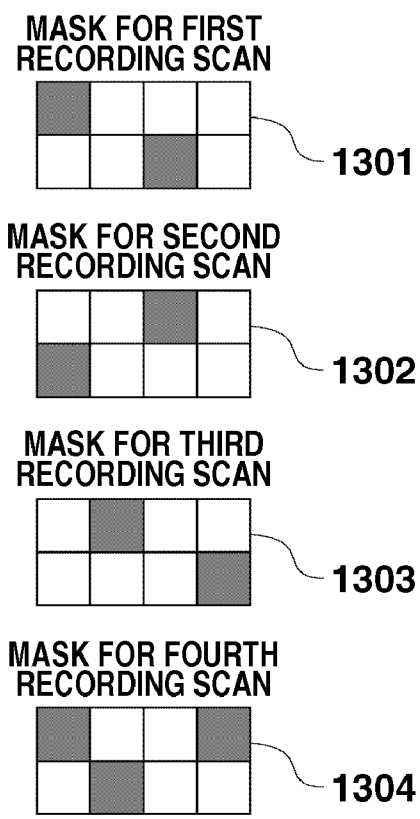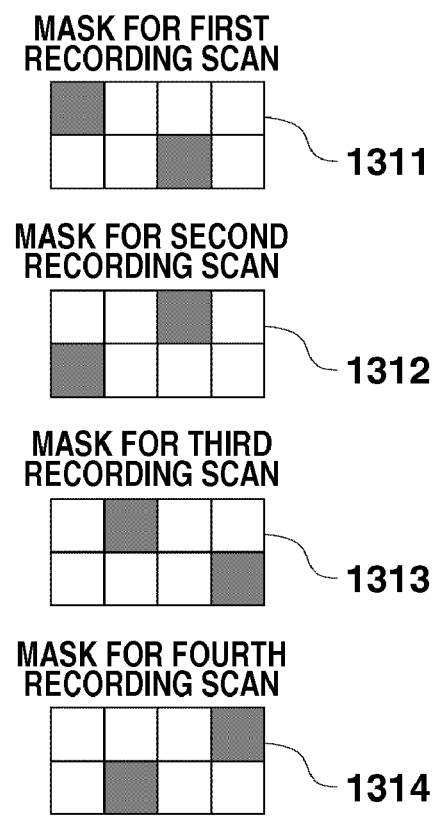
FIG.13A
FIG.13B

FIG.15
MASK FOR FIRST RECORDING SCAN
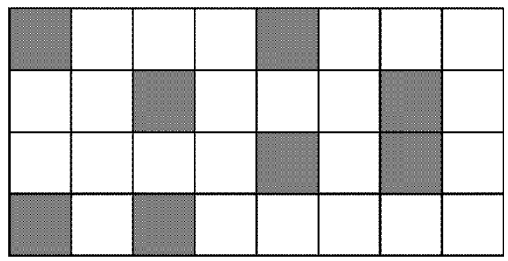
MASK FOR SECOND RECORDING SCAN
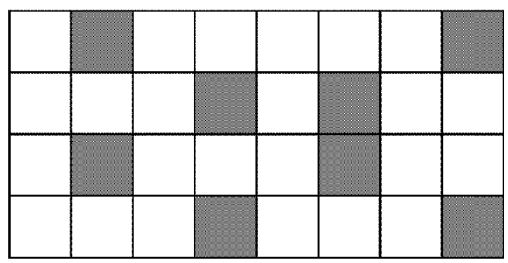
MASK FOR THIRD RECORDING SCAN
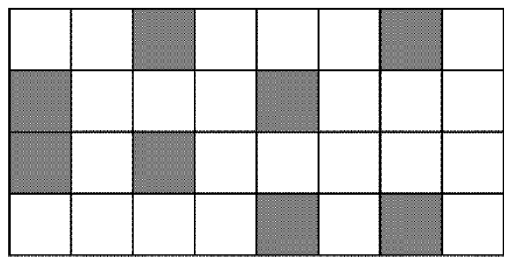
MASK FOR FOURTH RECORDING SCAN
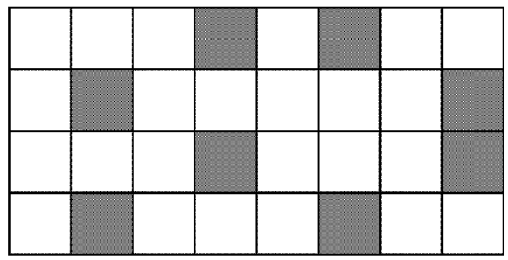
ODD NUMBER COLUMN ↕ EVEN NUMBER COLUMN

DATA GENERATION APPARATUS, INKJET RECORDING APPARATUS, AND DATA GENERATION METHOD

BACKGROUND OF THE INVENTION

1. Field of the Invention

The present invention relates to a data generation apparatus, an inkjet recording apparatus configured to perform recording by discharging pigment ink, and a data generation method.

2. Description of the Related Art

To meet growing demands for high resistance to light and water of recorded images, efforts are being directed toward development of an inkjet recording apparatus which uses ink containing pigments as a color material. Generally, a recording medium, such as glossy paper, has tiny pores formed on its surface to improve both absorption of an ink solvent and fixation of the color material. When dye ink is used, since the dye as a color material is absorbed through the pores simultaneously with absorption of water content, the dye penetrates into the inside of the recording medium.

On the other hand, when pigment ink is used, the pigment as a color material does not readily penetrate into the inside of the recording medium. This is because the pigment is hard to dissolve in water and is dispersed as fine particles in water, and those particles are larger than the pores of the surface of the recording medium. Therefore, when pigment ink is used, pigment molecules are deposited on the surface of the recording medium and fixed. Therefore, the smoothness of the surface of the recording medium is reduced, thus decreasing the glossiness of the printed image. The larger the amount of ink becomes, the thicker the ink dots are deposited, reducing the surface smoothness of a recording medium, so that the gloss tends to be reduced. The reduction in the gloss gives rise to relative gloss differences over the whole recorded image, and the irregularity of the gloss is noticeable.

As a solution to the issue of the uneven gloss of pigment ink, Japanese Patent Application Laid-Open No. 2008-162095 discusses a method for obtaining an even gloss on recorded images by using mask patterns of different degrees of dispersion according to gloss characteristics inherent to respective types of ink and also to their contour differences at the time of fixation.

The inventors of the present invention have found that the gloss irregularity is caused not only by a decrease in the glossiness due to deposition of the pigment on the surface of the recording medium. The finding is as follows.

In the areas of a recorded image, where a small number of ink dots are applied, most of the ink dots are not overlaid one on top of each other, but the ink dots are present independently of each other. At this point in time, the pigment is deposited on the surface, but a dispersing resin used to disperse the pigment in the ink mostly penetrates into the inside of the recording medium. Similarly, high-molecular compounds added for other purposes penetrate. Consequently, the pigment is often exposed at a colored layer as the outermost layer.

On the other hand, in the areas of a recorded image, where a large number of ink dots are applied, as described above, the pigment is deposited on the surface of the recording medium with undulations. At this time, owing to the filler-effects of the pigment-colored layer as the base coat, a dispersing resin and high-molecular compounds included in the ink hardly penetrate either into the pigment colored layer or the recording medium, and are fixed as they are deposited on the surface. Therefore, the outermost layer of the colored layer contains relatively high contents of the dispersing resin and the high-molecular compounds.

Dominant factors of the glossiness of recorded images are surface smoothness and surface reflectance. Generally, pigments have a reflectance higher than that of resins and high-molecular compounds. Therefore, in the areas where a small number of ink dots are applied, the gloss is high because the pigment is deposited in large amounts on the outermost layer. On the other hand, in the areas where a large number of ink dots are applied, since a resin and high-molecular compounds remain on the outermost layer, the undulations on the surface contribute to a reduction of surface smoothness, and the gloss is reduced.

As described above, in a recorded image printed with pigment ink, in the areas where a large number of ink dots are applied, the gloss is low, and in the areas where a small number of ink dots are applied, the gloss is high. Therefore, the uneven gloss of a recorded image is noticeable as the irregularity of the gloss.

SUMMARY OF THE INVENTION

According to an aspect of the present invention, an apparatus for generating data used to apply a plurality of inks similar in color and different in color material density, including a first ink and a second ink higher in color material density than the first ink, onto a pixel area on a recording medium with a recording head is provided. The apparatus includes a generation unit configured to generate the data in such a way that out of a plurality of pixels constituting the pixel area, a number of pixels onto which dots of the first ink are applied in an overlapped manner is greater than a number of pixels onto which dots of the second ink are applied in the overlapped manner.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating dot array patterns in the first exemplary embodiment.

FIG. 12 is a diagram illustrating dot array patterns in a second exemplary embodiment of the present invention.

FIGS. 13A and 13B are diagrams illustrating mask patterns in the second exemplary embodiment.

FIG. 15 is a diagram illustrating mask patterns in a third exemplary embodiment of the present invention.

DESCRIPTION OF THE EMBODIMENTS

Various exemplary embodiments, features, and aspects of the invention will be described in detail below with reference to the drawings.

Figure 3:
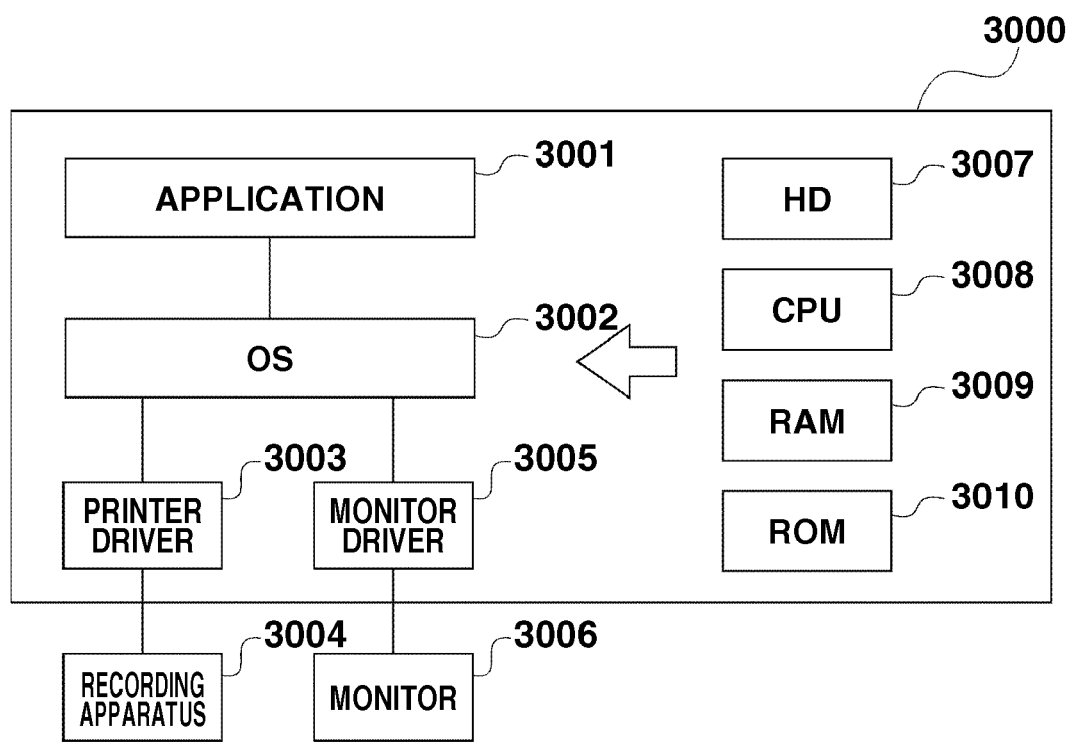
FIG. 3 is a block diagram illustrating an internal configuration of a data processing apparatus according to a first exemplary embodiment of the present invention.

FIG. 3 is a block diagram mainly illustrating configurations of hardware and software of a personal computer (hereafter referred to as a PC) as a data processing apparatus according to an exemplary embodiment of the present invention. A PC 3000 as a host apparatus uses an operating system (OS) 3002 to operate various types of software, such as application software 3001, a printer driver 3003, and a monitor driver 3005. The application software 3001 generates images in addition to performing items of processing, such as word processing, spreadsheet, and Internet browser. The monitor driver 3005 performs processing to cause a monitor 3006 to display images generated by the application software 3001.

The printer driver 3003 processes image data to be transmitted from the application software 3001 to the OS 3002, and generates binary data that can be recorded by a recording apparatus 3004. The generated binary data indicates whether ink is to be applied to form a recorded image. The types of ink used in the recording apparatus 3004 according to the present exemplary embodiment are six colors: cyan (C), magenta (M), yellow (Y), black (K), gray (Gy), and photo gray (Pgy). Image processing carried out by the printer driver 3003 will be described in detail below.

To operate the above-mentioned items of software, the host apparatus 3000 includes as its hardware a CPU 3008, a hard disk (HD) 3007, a RAM 3009, and a ROM 3010. The CPU 3008 executes processing of software components according to a program stored in the ROM 3010, and uses the RAM 3009 as its work area.

Figure 4:
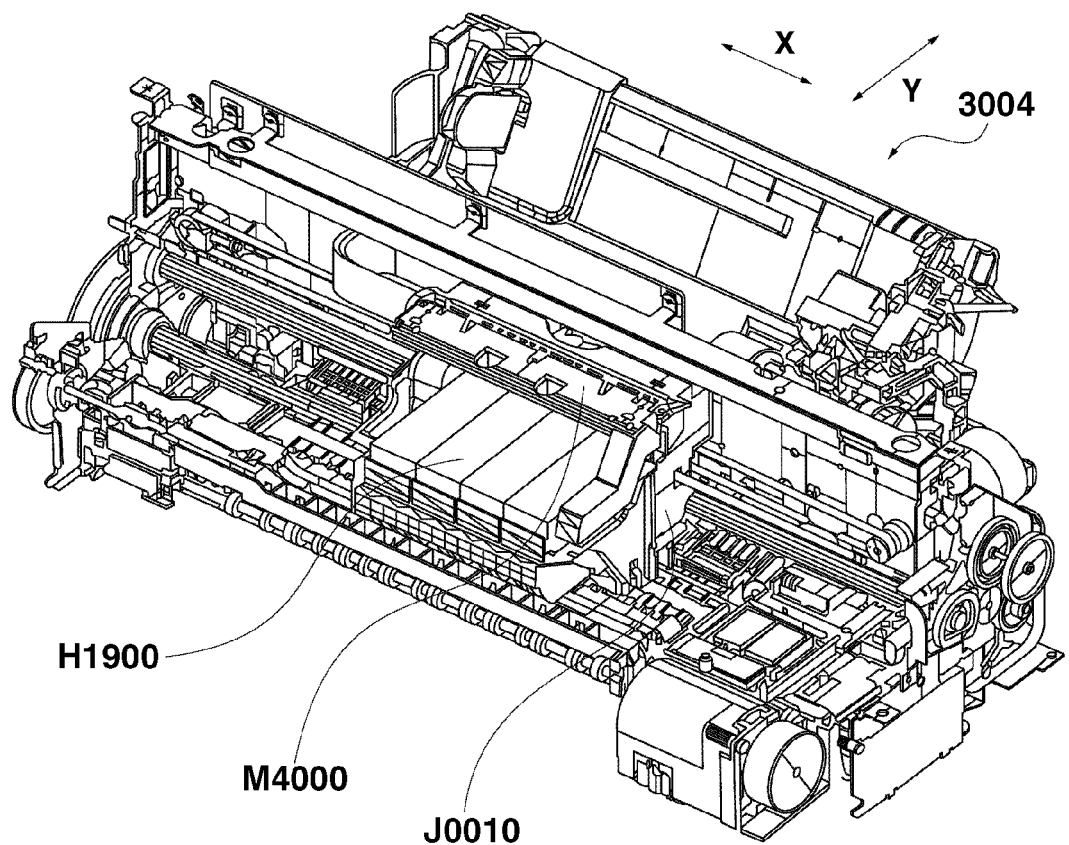
FIG. 4 is a perspective view of an inkjet recording apparatus according to the first exemplary embodiment.

FIG. 4 is a perspective view illustrating the recording apparatus 3004 according to the present exemplary embodiment. The recording apparatus 3004 according to the present exemplary embodiment is a serial type inkjet recording apparatus configured to form an image on a recording medium by using a recording head J0010 including multiple nozzles to discharge ink dots. The recording head J0010 includes a plurality of heads corresponding to inks of different colors, and those heads are respectively supplied with ink from ink tanks H1900 containing ink of different colors.

A carriage M4000 having the recording heads J0010 and the ink tanks H1900 mounted thereon travels (scans) in the X-direction (main scanning direction). At specified timing during the travel, ink is applied from each nozzle of the recording head j0010 according to binary ink Application data, which will be described below. When a recording scan by the recording head J0010 is completed, the recording medium is conveyed by a predetermined amount in the Y-direction (sub scanning direction) in FIG. 4.

The recording scan by the recording head and the conveyance of a recording medium described above are repeated intermittently, and an image is formed on a recording medium. In the recording head J0010 according to the present exemplary embodiment, 128 nozzles are arranged in the sub scanning direction to discharge ink dots at a density of 1200 dpi (dots/inch) for each color, and ink dots with a droplet amount of about 2 pico-liters (pl) are applied from each nozzle.

Figure 5:
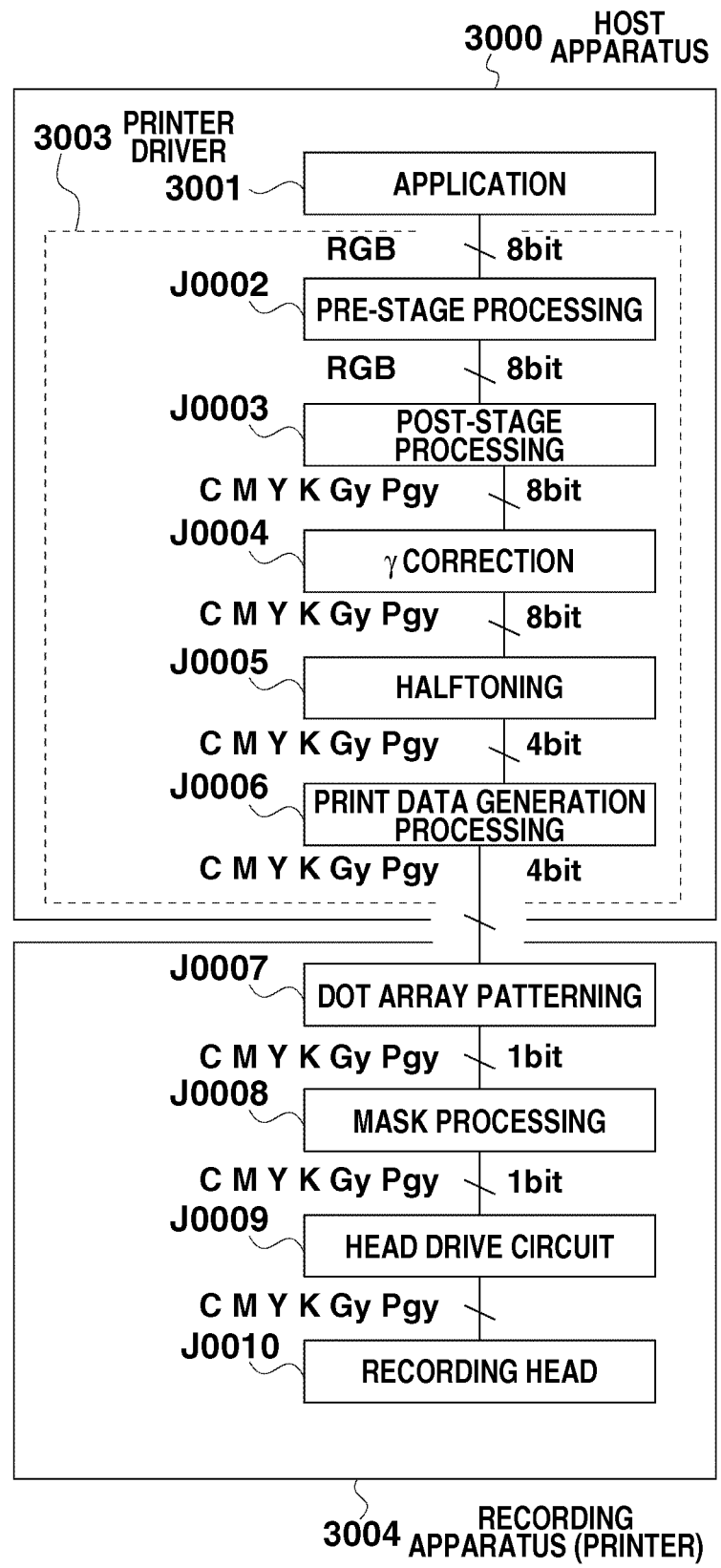
FIG. 5 is a block diagram illustrating a flow of steps of image data conversion processing.

FIG. 5 is a block diagram illustrating a flow of steps of converting image data in an inkjet recording system according to the present exemplary embodiment. The inkjet recording system includes a host apparatus 3000 and a recording apparatus (printer) 3004. In the present exemplary embodiment, the host apparatus 3000 is configured to generate image data representing an image to be recorded or to set a user interface (UI) to generate image data. The recording apparatus (printer) 3004 records an image by using ink colors, such as C, M, Y, K, Gy, and Pgy described above. Those types of ink are pigment ink containing pigment as a color material.

At the time of recording an image, image data generated by the application 3001 is sent to the printer driver 3003 via the OS 3002. The printer driver 3003 subjects received image data to pre-stage processing J0002, post-stage processing J0003, γ correction J0004, halftoning J0005, and print data generation processing J0006, each of which will be described briefly in the following.

The pre-stage processing J0002 performs a mapping of a color gamut. By this processing, data conversion is performed to map a color gamut reproduced by image data R, G, and B in the sRGB standard into a color gamut reproduced by the recording apparatus. More specifically, R, G, B data each in 8-bit (256) gradations is converted into R, G, B data each in 8-bit (256) gradations with different contents by using a three-dimensional look-up table (LUT).

In the post-processing J0003, based on R, G, B data for which mapping of the color gamut has been performed, 8-bit color separation data C, M, Y, K, Gy, and Pgy are obtained which correspond to combinations of ink for reproducing colors expressed by the R, G, B data. Like in the pre-stage processing, the processing is performed by simultaneous use of interpolation calculations by using the three-dimensional table LUT.

The γ correction J0004 converts density values (gradation values) for each color data of separated color data obtained by the post-stage processing J0003. In other words, by using a one-dimensional LUT corresponding to gradation characteristics of each color ink in the recording apparatus, the conversion processing is performed so that the separated color data can be associated linearly with the gradation characteristics of the recording apparatus. As described below, the conversion is performed using an LUT illustrated in FIG. 9.

The halftoning J0005 performs quantization processing on each of 8-bit color separated data C, M, Y, K, Gy, and Pgy to obtain 4-bit data. In the present exemplary embodiment, by using a multi-value error diffusion method, 8-bit (256 gradations) data is converted to obtain 4-bit (9 gradations) data. This 4-bit data is gradation value information that indicates one of levels 0 to 8 as an index to represent a dot array pattern in dot array patterning processing J0007 to be executed in the recording apparatus. This 9-gradation index is illustrated in FIG. 6.

The print data generation processing J0006 forms print data by adding printing control information, including print information, such as a quality level of a recorded image, a type of recording medium, color or monochrome, to print image information as an aggregate of gradation value information.

When print data is sent from the host apparatus 3000 to the recording apparatus 3004, the recording apparatus 3004 performs the dot array patterning processing J0007 and mask processing J0008 on the input print data.

The dot array patterning processing J0007 rasterizes gradation value information in 9 gradations of 4-bit data as an output value from the halftoning J0005 into a dot array pattern and performs binary digitizing processing on 4-bit data by using the dot array pattern. By this processing, 4-bit data is converted into binary data that represents presence or absence (discharge or non-discharge) of recording of ink dots (ink droplets) in an area corresponding to one pixel of multi-valued data. In this case, data for a pixel (hereafter referred to as a pixel area) of multi-valued (4-bit) data is converted into 2×4 pixel data, each pixel being a binary (1-bit) unit. A dot array pattern in 9 gradations used in the present exemplary embodiment is described below with reference to FIG. 6.

In FIG. 6, level values on the left side of the diagram correspond to 9 gradations (levels 0 to 8) output from the halftoning J0005. In the pixel areas, black pixels are pixels to be recorded with applied ink, and one pixel of binary data corresponds to a minimum unit to define whether the pixel is recorded or not recorded with ink droplets. In the present exemplary embodiment, a pixel (pixel area) of multi-valued data is recorded with ink droplets at a pixel density of 600 dpi high×600 dpi wide. Binary data corresponding to this pixel area is formed of an area of 2 pixels high×4 pixels wide, which is recorded at a recording density of 1200 dpi high×400 dpi wide. In a recording apparatus according to the present exemplary embodiment, it is so designed that an ink dot of 4 pl can be recorded with each color onto a pixel of binary data in a size about 20 μm high×about 10 μm wide. A vertical direction of the drawing is a direction in which nozzles of the recording head are arranged, and both the recording density of a binary pixel and the nozzle array density are the same at 1200 dpi. A horizontal direction of the drawing is a scanning direction, and ink dots are recorded at a density of 2400 dpi in the scanning direction.

The mask processing J0008 p carries out a logical AND between the dot arrays of the colors determined by the dot array patterning processing J0007 and a plurality of mask patterns which are in a mutually complementary relationship with each other. Accordingly, multi-pass recording is performed as follows. In the present exemplary embodiment, it is supposed that multi-pass recording using 4 passes is performed. The features of mask patterns used in the present exemplary embodiment are described below in greater detail. By this mask processing, for each of the colors C, M, Y, K, Gy, and Pgy, data, on which ink droplets are applied, is generated for each of recording scans, which constitute multi-pass recording.

The generated binary data is sent to a head drive circuit J0009. One-bit data of each color input to the drive circuit J0009 is converted into drive pulses for the recording head J0010, and the recording head J0010 of each color discharges ink at appropriate timing in multiple recording scans. Thus, ink is applied according to recording data to record images on a recording medium.

The above-described multi-pass recording is described below. Multi-pass recording is a method for recording images by performing scanning with the recording head a specified number of times in unit areas of a recording medium.

Figure 1:
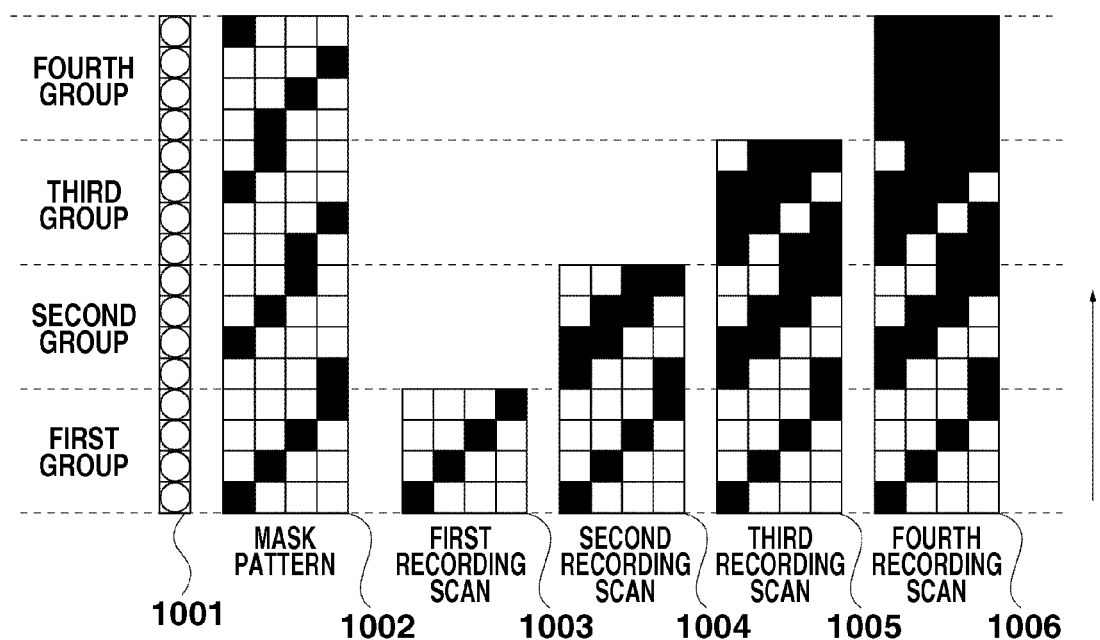
FIG. 1 is a schematic diagram illustrating multi-pass recording.

FIG. 1 is a diagram schematically illustrating the recording head and mask patterns to describe multi-pass recording. A recording head 1001 is supposed to include 16 nozzles for simplicity's sake. As illustrated in FIG. 1, the nozzles are divided into four nozzle groups, a first nozzle group to a fourth nozzle group, and each nozzle group includes four nozzles. In each of mask patterns 1002, black portions indicate pixels where ink dots can be recorded by scanning (hereafter referred to as recordable pixels), and white portions indicate pixels where ink dots cannot be recorded (hereafter referred to as non-recordable pixels). The patterns that are recorded by different nozzle groups are in a mutually complementary relationship to each other, so that if the patterns are superposed, ink dots are recorded in a 4×4 pixel area.

Recording scans 1003 to 1006 illustrate how an image is completed by repeating recording scans. Every time each recording scan is completed, a recording medium is moved by an amount corresponding to the width of the nozzle groups in the arrow direction in FIG. 1, and recoding of an area corresponding to a total width of the four nozzle groups is completed by a total of four recording scans.

By using multi-pass recording, it is possible to reduce negative effects on images, such as streaks or density irregularity. Even though there is variation in discharge characteristics and discharge quantity among the nozzles, the characteristics and so on are dispersed and become less noticeable. In FIG. 1, an example has been discussed in which multi-pass recording using 4 passes is performed in the same image area, but the number of times is not limited to 4 passes. The larger the number of passes increases, the more the variation in discharge characteristics and discharge quantity is dispersed and more smoother images can be obtained.

Figure 2:
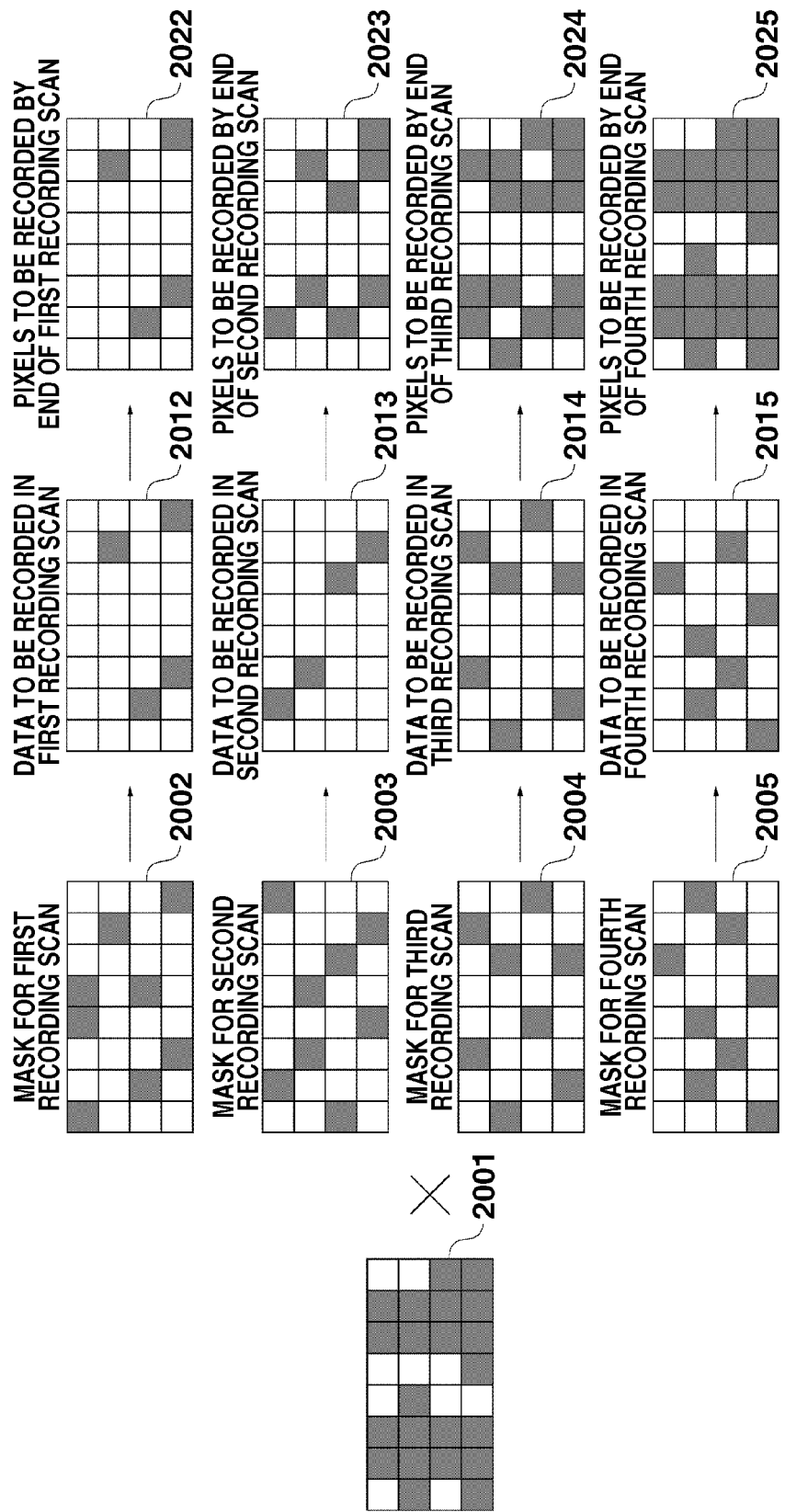
FIG. 2 is a schematic diagram illustrating multi-pass recording by 100% recording.

FIG. 2 is a schematic diagram illustrating multi-pass recording. Though FIG. 1 illustrates an example in which image data with 100% recording rate is recorded, FIG. 2 cites an example in which image data at pattern 2001 is recorded by multi-pass recording. Image data 2001 is given in an area of 4 pixels high×8 pixels wide. Mask patterns 2002 to 2005 are in a mutually complementary relationship to each other. A logical AND is carried out between image data 2001 and mask patterns 2002 to 2005 so that 100% recording is achieved by 4 recording scans like in mask patterns 1002, a result of which is illustrated in data 2012 to 2015. The patterns 2022 to 2025 indicate how an image is completed. Image data at completion of an image at pattern 2025 is identical with image data at pattern 2001.

When the multi-pass recording described above is used, as discussed earlier, due to the surface undulations in areas where a large number of ink dots are applied, the loss of the surface gloss becomes more noticeable. In other words, when an ink, such as a pigment ink, is used, the color material of which does not readily penetrate into the inside of a recording medium, in the areas where a large amount of ink is applied, ink droplets applied by each recording scan are deposited on the surface of the recording medium and fixed. Unlike when multi-pass recording is not used, the pigment remains on the surface with undulations, and the smoothness of the surface is reduced, so that the glossiness of the image deteriorates. In the areas where a small number of ink dots are applied, the above-mentioned exposure of the pigment contributes to a high glossiness of the surface. Therefore, the gloss irregularity becomes more conspicuous due to a gross difference from the areas where a large number of ink dots are applied.

In contrast, in the present exemplary embodiment, the gloss irregularity of recorded images is restrained by discharging an ink with lowest color material density in an ink set to the same position in a pixel area in an overlapped manner. In the present exemplary embodiment, the same position in a pixel area corresponds to a pixel of binary data that specifies whether to record or not to record ink droplets. When types of ink having different color material densities are used, inks lower in color material density tend to cause a smaller dot height (smaller surface roughness) on a single dot level basis and achieve a higher gloss than by using inks higher in color material density. Therefore, by discharging ink droplets low in color material density, the surface smoothness in recorded images can be reduced by controlling recording so that the glossiness does not become too high.

Inks lower in color material density tend to cause a smaller granularity in areas where a smaller number of ink dots are applied, namely, in low gradation areas in a recorded image, so that a smooth gradation can be obtained. Therefore, when an ink set is used including inks with different color material densities of similar colors, inks low in color material density are more often selectively used in low gradation areas with low density information. For this reason, the above-described control IS to be performed for inks with low color material density. A recording method characteristic of the present exemplary embodiment is described below.

Figure 7:
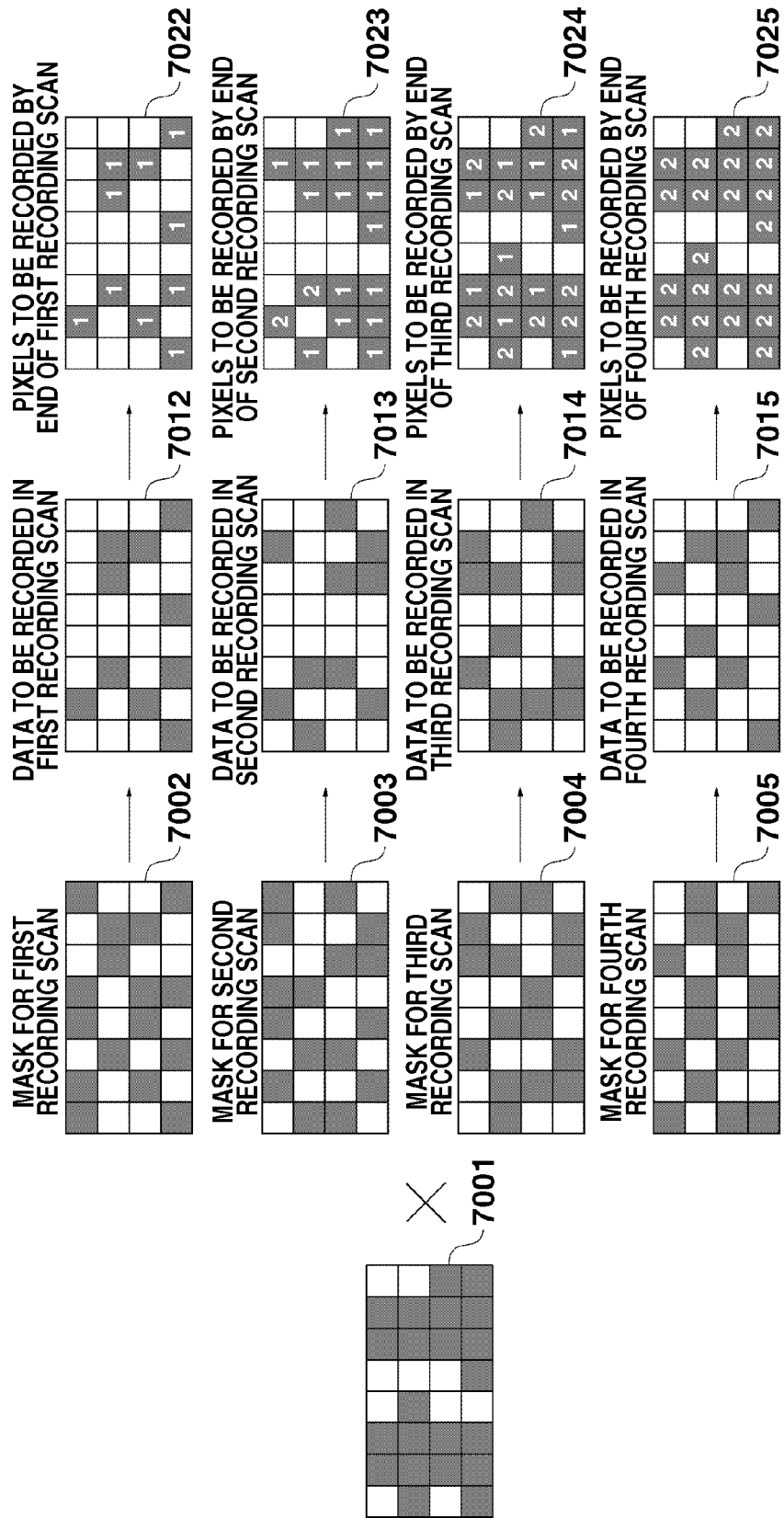
FIG. 7 is a schematic diagram illustrating multi-pass recording by 200% recording.

In FIG. 7, masks 7002 to 7005 have mask patterns for 4-pass recording applied to Pgy ink. Among similar colors, including black K, gray Gy, photo gray Pgy, the Pgy ink is an ink with lowest color material density in the ink set in the present exemplary embodiment. The masks 7002 to 7005 are used in different recording scanning operations. Like in FIG. 2, recordable pixels are indicated by black, and non-recordable pixels are indicated by white. By performing a logical AND between image data 7001 and mask patterns 7002 to 7005, image data is divided into data 7012 to 7015 to be recorded in separate recording scanning operations. Patterns 7022 to 7025 illustrate how an image is formed by performing the first to fourth recording scans. The number written in each recordable pixel designates a number of dots recorded in that pixel.

As is understood from FIG. 7, the mask patterns of Pgy ink as an ink with lowest color material density in the present exemplary embodiment amount to 50% recording rate in each recording scan of 4 passes. When the mask patterns of all of 4 passes are put together, 200% recording rate can be obtained. In other words, data can be generated to discharge ink dots to the same position (pixels) in the pixel area two times in scanning actions.

FIG. 7 illustrates an example in which 200% recording is performed by mask patterns which are applicable with an ink with color material density lowest in the ink set, but the present invention is not limited to this method. In other words, in a pixel area where recording is performed using an ink with low color material density, some dots can be selectively applied in an overlapped manner, an example of which is illustrated in FIG. 8.

Figure 8:
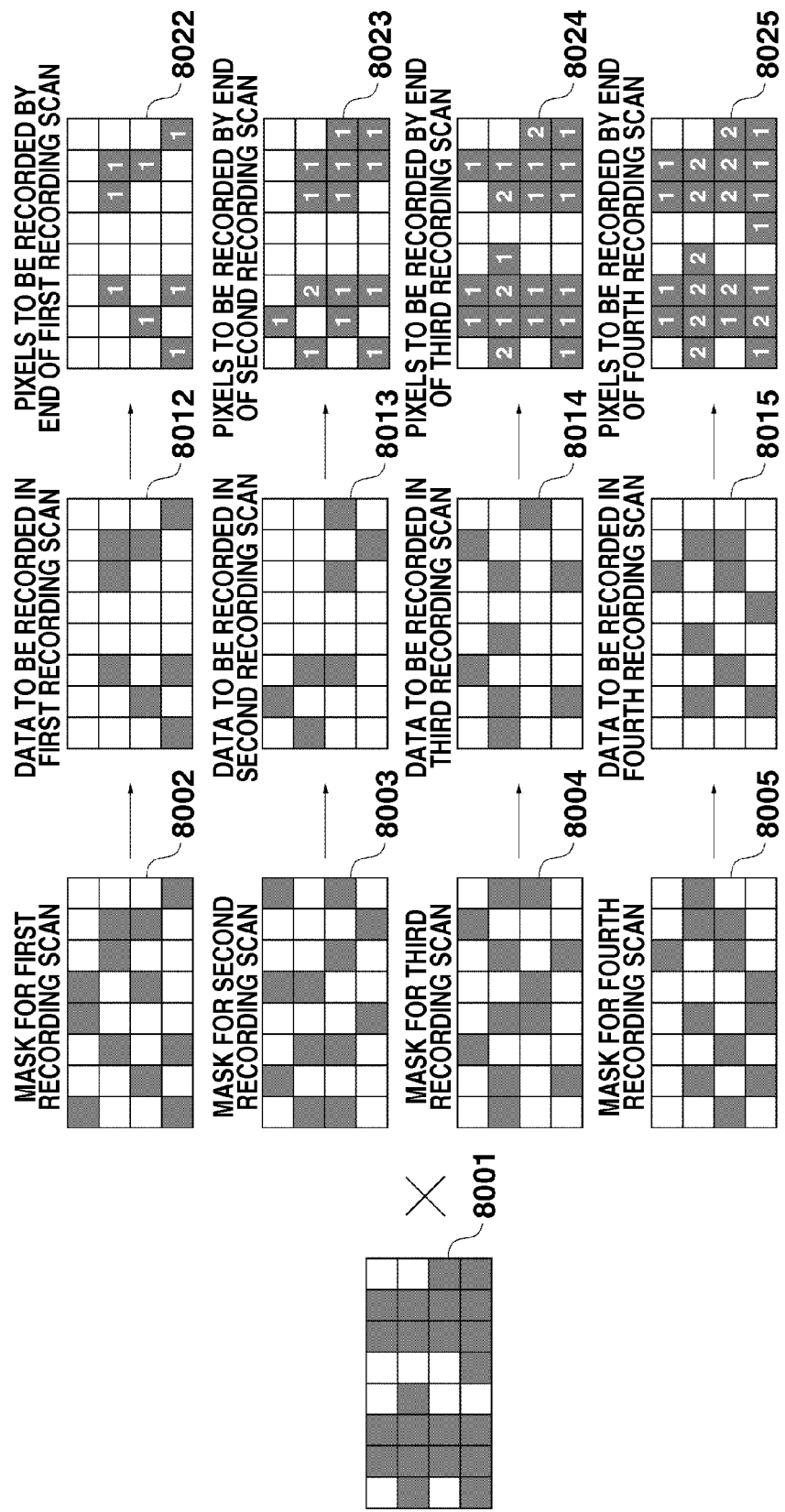
FIG. 8 is a schematic diagram illustrating multi-pass recording by 150% recording.

Like in FIGS. 2 and 7, FIG. 8 illustrates image data 8001 in an area of 4 pixels high×pixels wide. A logical AND is performed between image data 8001 and mask patterns 8002 to 8005, and results of the AND operation are data 80122 to 8015. Mask patterns 8022 to 8025 indicate how an image is completed as recording scans are repeated. A feature of those mask patterns is that pixels recorded by each scanning occupies 37.5% recording rate of all pixels, and when the percentages by all passes are put together, the recording rate amounts to almost 150%. Therefore, dots recorded in 4 recording scans are recorded two times on some pixels in different scanning actions. Out of pixels specified to be recorded in pattern 8001, two dots are recorded in 50% of the specified pixels, and one dot is recorded in the remaining 50% pixels. In this method of using mask patterns for 150% recording, too, the issue caused by the high glossiness can be reduced effectively.

As described, when a plurality of types of ink with different color material densities are used, mask patterns can be arranged in such a way that some dots are applied in an overlapped manner as illustrated in FIGS. 7 and 8 by using an ink low in color material density as a first ink used for recording in low gradation areas with high gloss. This method makes the number of pixels onto which the first ink is applied in an overlapped manner greater than the number of pixels onto which a second ink, which is lower in color material density than the first ink and is used for recording in high gradation areas, is applied in an overlapped manner.

If comparisons are made by taking the above-described mask patterns in FIG. 2 for example, the mask patterns in FIG. 2 achieve a recording rate of 25% in each recording scan, and the recording rate reaches almost 100% when results by all passes are put together. In this case, ink dots recorded by scanning four times are not controlled to be applied at the same position two times in any scanning actions.

Figure 9:
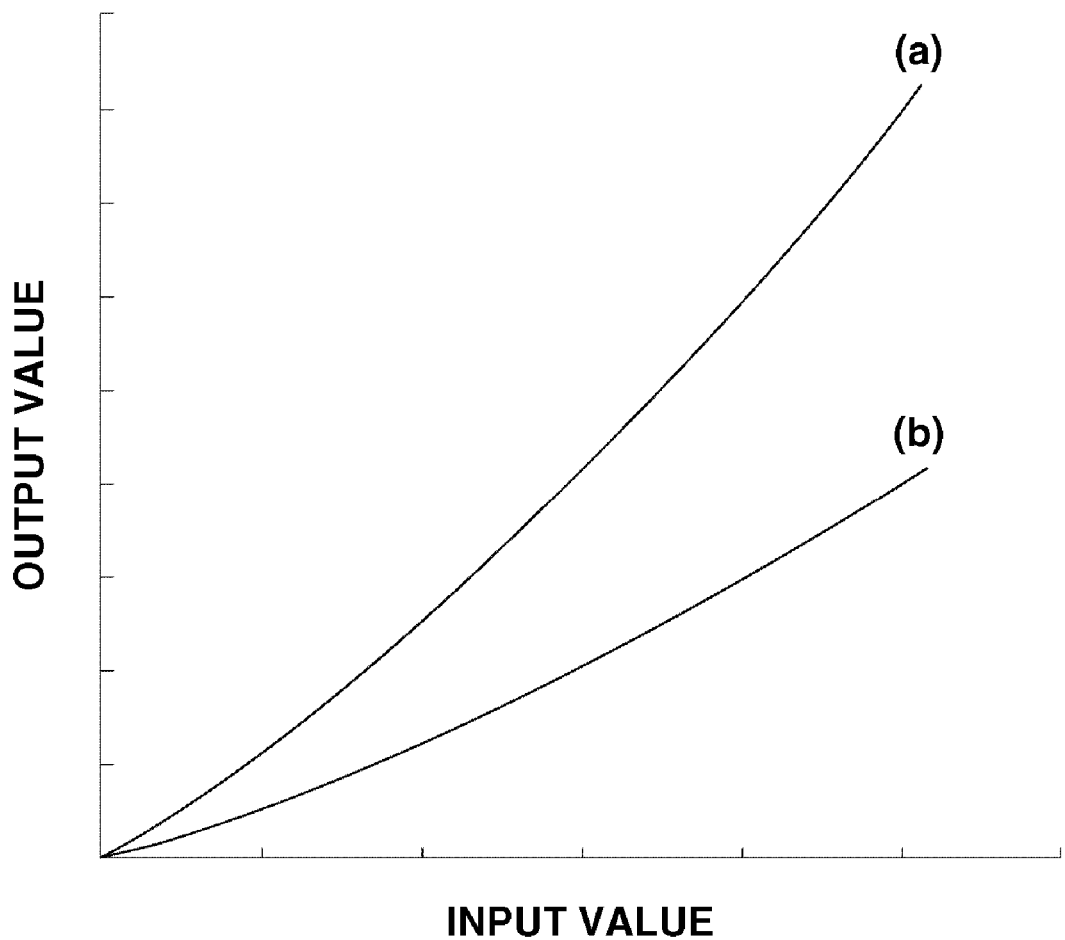
FIG. 9 is a graph illustrating output values when density values are converted by using γ correction.

The density value conversion in the γ correction J0004 described above is now described. FIG. 9 is a graph indicating output values of density value conversion performed in the γ correction J0004 in relation to input values of the colors obtained in the post-stage processing J0003. The line (a) in FIG. 9 concerns a case where mask patterns for 100% recording illustrated in FIG. 2 are used, and indicates density value data in 256 gradations from 0 to 255.

The line (b) in FIG. 9 relates to a case where mask patterns for 200% recording illustrated in FIG. 7 are used, and indicates density value data in 128 gradations form 0 to 127. In the present exemplary embodiment, 200%-recording mask patterns are used only for Pgy ink as an ink with a color material density lowest in the ink set, and 100%-recording masks are used for inks of the other colors. More specifically, the line (b) indicates output values of the Pgy ink, and the line (a) indicates output values of K ink and Gy ink. At this point in time, an output value of the line (b) is at a value 0.5 times the output value of the line (a). Therefore, if 200%-recording mask patterns are used for Pgy ink, because ink dots are applied two times in a pixel area corresponding to density data with a density 0.5 times—half as high as a density when 100%-recording mask is used, a result on a recorded image is equivalent to as if the same number of ink dots are applied as the quantity when 100%-recording mask is used.

Figure 10:
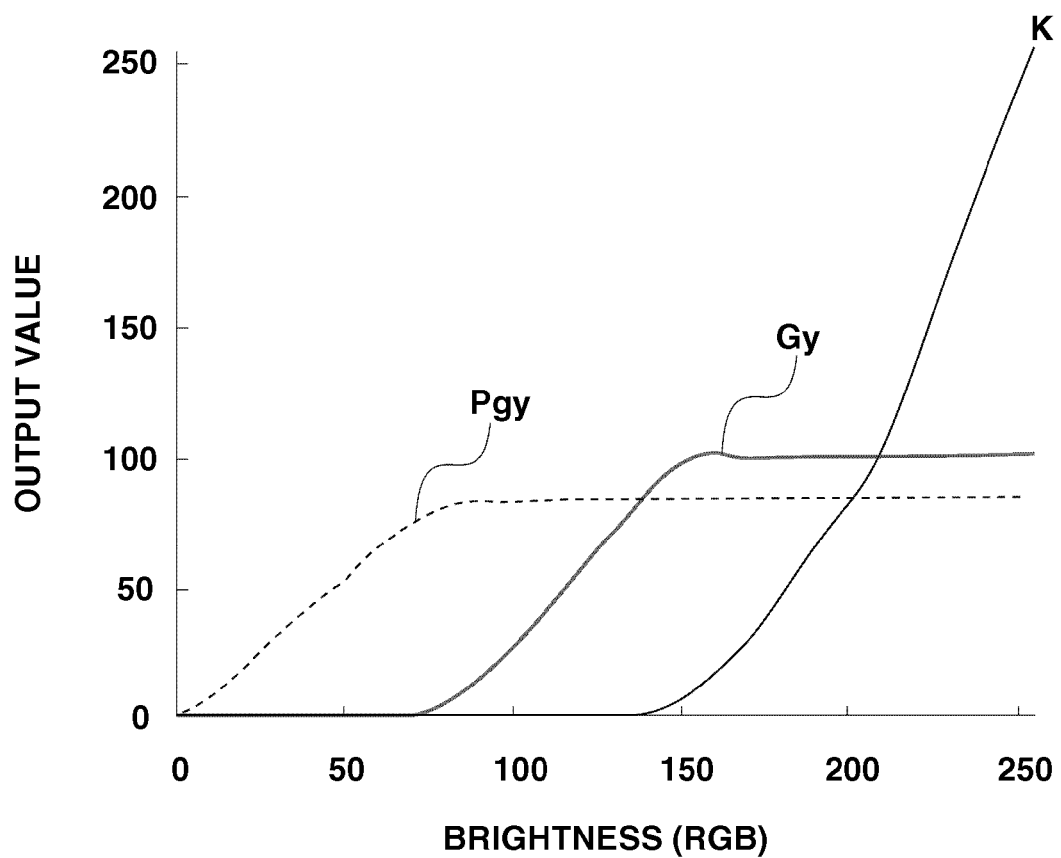
FIG. 10 is a graph illustrating output values when an ink set is used in the first exemplary embodiment.

FIG. 10 is a diagram illustrating output values of inks with respect to input values when an ink set, including similar colors with three different color material densities (K/Gy/Pgy), is mounted and a gray scale image is recorded. As described above, generally, inks lower in color material density tend to cause a smaller granularity in low gradation areas, so that a smooth gradation can be obtained. For this reason, images are formed by using Pgy ink in the low gradation areas. Gy ink is used in higher gradation areas than in low gradation areas where only Pgy ink is used, and K ink is used in the highest gradation areas.

Figure 11:
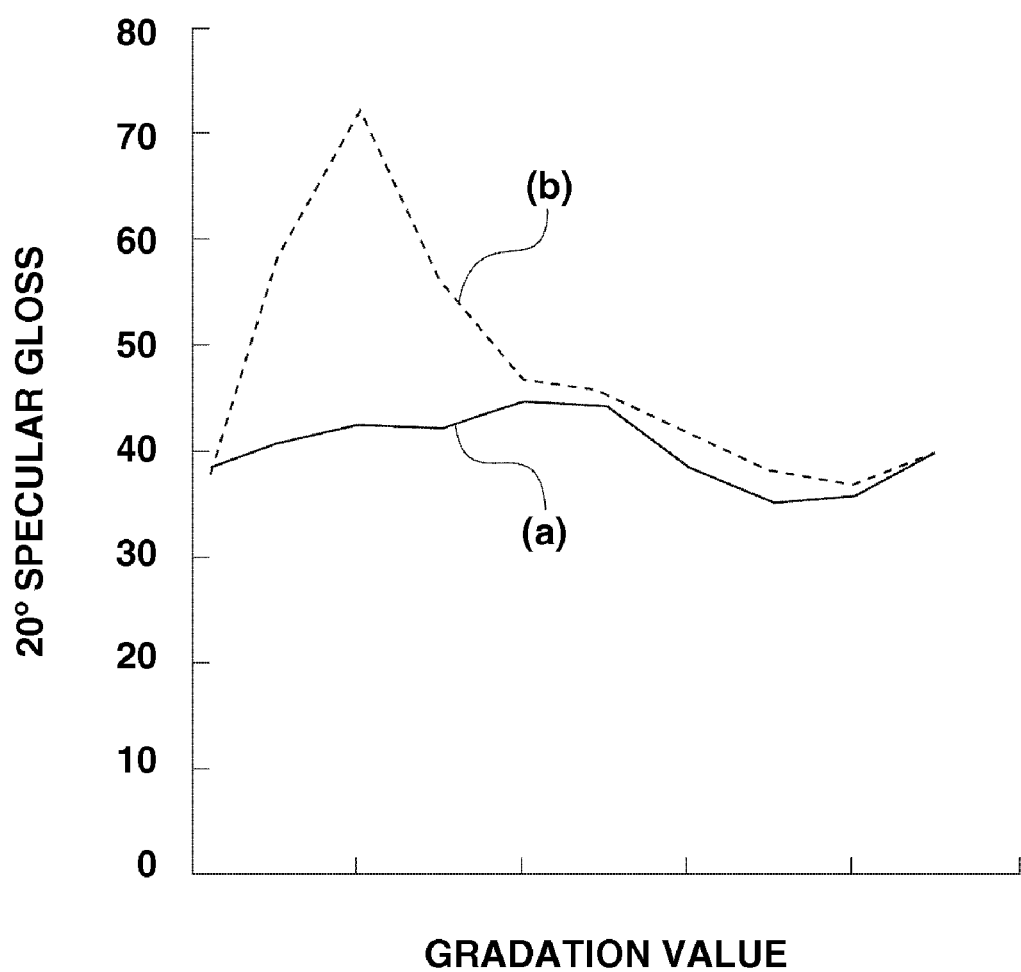
FIG. 11 is a graph illustrating 20° specular gloss of recorded images in the first exemplary embodiment.

FIG. 11 is a graph illustrating measurement results of 20° specular gloss in recorded images when images were recorded in low to high gradation areas on glossy paper (Premium glossy paper made by Canon Inc.: LFM-GPPC) by using different inks illustrated in FIG. 10. A BYK-Gardner micro-haze plus was used in measuring the 20° specular gloss. The line (a) indicates a measurement result in the present exemplary embodiment, in which 200%-recording mask patterns were used for Pgy ink with lowest color material density and 100%-recording mask was used for K and Gy inks. The line (b) indicates a measurement result of the 20° specular gloss when 100%-recording mask was used for all of the colors. Compared with the line (b), the line (a) indicates that the 20° specular gloss in low gradation areas was so restrained as to be at a level almost equal to the 20° specular gloss in the high gradation areas. Therefore, the gloss of recorded images was made uniform, and the gloss irregularity was reduced.

In the present exemplary embodiment, an example is introduced in which a control unit is operated to increase a proportion of scanning actions in which the Pgy ink lowest in color material density in the ink set is applied in an overlapped manner to record an image.

The present invention is not limited to this example when a plurality of ink sets is used. For example, the present invention can be applied to a case where an ink set including cyan (C) and photo cyan (Pc) and an ink set including magenta (M) and photo magenta (Pm) are used in addition to the ink set including K, Gy, and Pgy inks. In those ink sets, inks low in color material density are Pgy, Pc, and Pm, and for at least one color of those colors, if the control unit is operated in such a way that ink dots are applied in an overlapped manner, the benefits of the present invention can be achieved. The more the number of applied inks increases, the more conspicuous the benefits of the invention become, but situations become higher for adverse effects, such as deteriorating granularity, to appear. Therefore, colors to use by considering color separation and various image characteristics are to be determined.

In the present exemplary embodiment, to generate data used to discharge ink dots in an overlapped manner, multi-pass recording has been described using mask patterns of 200% and 150% recording rates. However, the present invention is not limited to the use of those mask patterns. Recording may be performed by a method without using mask patterns so long as ink droplets are applied to the same position in an overlapped manner to reduce the gloss of a recorded image. When ink dots are applied, so long as the deposited ink dots are not leveled and the surface undulations are not promoted, ink dots may be applied in the same recording scan. In other words, ink dots need not be applied by different scanning operations and multi-pass recording need not be performed.

In the present exemplary embodiment, a case is introduced where ink dots are applied in an overlapped manner using the 200%- or 100%-recording mask pattern with Pgy ink as light ink throughout all gradation areas. However, the amount of ink applied increases as the gradation increases, and even if the light ink is not applied in an overlapped manner, the surface smoothness decreases and the gloss decreases. More specifically, ink has only to be applied in an overlapped manner in low gradation areas with a high gloss, to a level corresponding to at least a lowest density, and light ink need not be applied in all gradation areas. In this case, as illustrated in FIG. 12, the above-mentioned issue can be solved by applying light ink in two dots to the same position (pixel) two times at level 1, and applying one dot each to shaded positions from level 2 and subsequent levels.

As described above, in the present exemplary embodiment, by applying the first ink mainly used for low gradation areas in such a way that the number of pixels onto which the first ink is applied in an overlapped manner is greater than the number of pixels onto which the second ink higher in color material density than the first ink is applied in an overlapped manner, the gloss of the recorded image in the low gradation areas is reduced and the gloss irregularity in the recorded image can be improved.

Next, a second exemplary embodiment of the present invention is described. In the first exemplary embodiment, by applying an ink low in color material density in an overlapped manner, the high gloss in the low gradation areas is restrained. In the second exemplary embodiment, by applying ink to areas at a low gradation level in image data in an overlapped manner, the gloss in the low gradation areas is reduced and the gloss irregularity is improved. In the present exemplary embodiment, description is made using black (K) ink.

Figure 12:
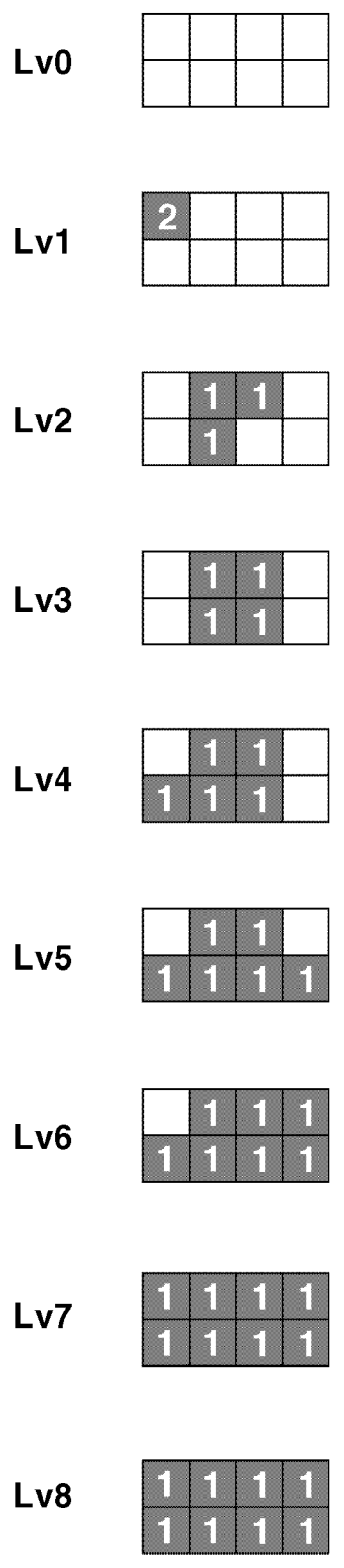

FIG. 12 illustrates dot array patterns in the present exemplary embodiment. The numbers in pixel areas at 9 gradations, 0 to 8 levels indicate the numbers of times of application of an ink dot to each pixel. In the present exemplary embodiment, level 1 as the lowest density of ink applied is used as a threshold value, and ink droplets to be recorded are applied to the same position in an overlapped manner in a pixel area specified as a low gradation of level 1 or less (first gradation information), and ink droplets are applied to different positions in each of pixel areas specified as level 2 or higher (second gradation information). By using this method, in the low gradation areas, the smoothness of the surface is reduced, the gloss is decreased, and the gloss irregularity is suppressed.

As described above, the low gradation areas likely to have a high gloss are present in pixel areas where not many droplets are applied. On the other hand, the high gradation areas likely to have a low gloss exist in pixel areas where a large number of ink droplets are applied. By generating data used to apply ink droplets and recording ink dots, in the low gradation areas, the increased surface undulations serve to suppress the high gloss, and in the high gradation areas, ink droplets are applied to different positions and the decrease in gloss is suppressed.

In the second exemplary embodiment, data is generated which is used to discharge ink droplets based on a threshold value of level 1, but this invention is not limited to this method. The threshold value is not limited to binary data, but may be multi-valued data.

FIGS. 13A and 13B illustrate mask patterns for 4 passes, which are 2 pixels high×4 pixels wide. Mask patterns 1301 to 1304 in FIG. 13A are for recording scans for level 1. Mask patterns 1311 to 1314 in FIG. 13B are for recording scans for levels 2 to 8. Like in the first embodiment, recordable pixels are indicated by black and non-recordable pixels are indicated by while. The mask patterns in FIG. 13A used for level 1 are structured so that ink is applied to a pixel in an overlapped manner to be recorded in a dot array pattern of level 1, that is, in a pixel at its upper left corner. On the other hand, mask patterns in FIG. 3B used for levels 2 to 8 are patterns of 100% recording, so that one dot is recorded in each pixel.

Figure 14:
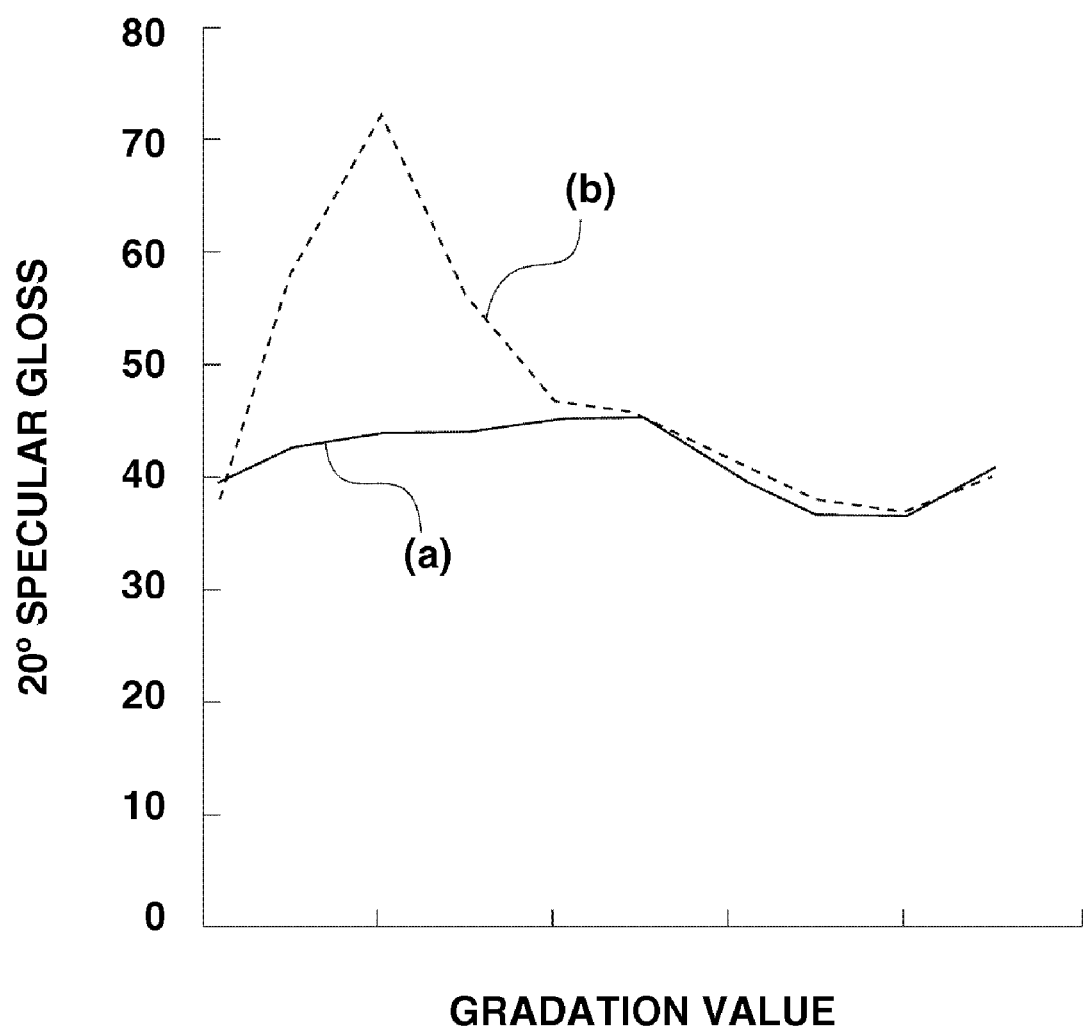
FIG. 14 is a graph illustrating 20° specular gloss of recorded images in the second exemplary embodiment.

FIG. 14 is a graph illustrating measurement results of the 20° specular gloss on a glossy paper medium similar to the first exemplary embodiment and producing a recorded image by a method similar to the first exemplary embodiment. The line (a) in FIG. 14 indicates measurement results of the 20° specular gloss in the present exemplary embodiment in a case where the dot array patters in FIG. 12 were used for all of the colors and the mask patterns reflecting those dot array patterns were used. The line (b) in FIG. 14 indicates measurement results of the 20° specular gloss in a case where the dot array patters in FIG. 6 were used for all of the colors. Compared with the line (b), the line (a) in FIG. 14 indicates that the 20° specular gloss in the low gradation areas is so suppressed as to be at a value approximately equal to the 20° specular gloss in the high gradation areas. Therefore, the gloss of recorded products is made uniform, and the gloss irregularity due to differences in surface gloss is restrained.

In the present exemplary embodiment, a method is used which applies ink dots in an overlapped manner in the low gradation areas, lower than the threshold value, when black (K) ink is used, so that the high gloss in the low gradation areas is restrained and the gloss irregularity can be improved.

The present invention is not limited to this method. For example, when two, black (K) and gray (Gy), colors are used, the above method may be performed using only gray ink. Moreover, when three, black (K), gray (Gy), and photo gray (Pgy), colors are used, the above-described method may be used using two, gray (G) and photo gray (Pgy), colors or only one photo gray color (Pgy). The threshold value need not be level 1, and control may be performed using multiple threshold values. In the present exemplary embodiment, a case has been discussed in which ink is applied to the same position in all pixel areas for recording level 1 in an overlapped manner. The present invention is not limited to this method, but if the glossiness can be reduced in pixel areas corresponding to level 1, not all types of ink need be applied in an overlapped manner.

A third exemplary embodiment of the present invention is described below. In the first and second exemplary embodiments, the gloss irregularity is improved by using mask patterns so arranged as to allow ink dots to be recorded in an overlapped manner. In the third exemplary embodiment, a method is adopted which controls recording so that ink dots, which are applied to adjacent pixels in the low gradation areas of a recorded image, are applied in different recording scans.

In the present exemplary embodiment, the dot array patterns of image data to be recorded are the dot array patterns in FIG. 6, in which level 1 is not selected, but level 0 and level 2 are selected.

In the present exemplary embodiment, ink droplets of 4 pl are applied at a resolution of 1200 dpi high×2400 dpi wide. Therefore, when two dots are applied to one pixel measuring about 20 μm high×and 10 μm wide, the diameter of the recorded dot is about 30 to 40 μm. Consequently, even if the two dots are not overlapped perfectly, the dots are positioned adjacent to each other or partly overlapped. Although the dots are not in a perfectly overlapped position, overlapping effects are provided, that is to say, sufficient gloss reduction effects can be obtained.

FIG. 15 illustrates an example of mask patterns for 4 passes which are applied with an ink with the lowest color material density in the ink set in the present exemplary embodiment. A feature of those mask patterns is that in the dot array patterns illustrated in FIG. 6, two dots corresponding to level 2 are arranged so as to be recorded in different scans. In the dot array patterns illustrated in FIG. 6, since the dot array patterns corresponding to level 2 are arranged side by side in the scanning direction, the two pixels are inevitably selected as an even number column or an odd number column. By using the mask patterns illustrated in FIG. 15, in odd number recording scans, the columns are separated so that only odd-number columns can be recorded, and in even number recording scans, the columns are separated so that only even-number columns can be recorded. Therefore, when recording is performed by using the masks illustrated in FIG. 15, adjacent two pixels in the main scanning, horizontal, direction are recorded in different scans, with the result that the two pixels are arranged side by side with each other on a glossy paper recoding medium, and recorded with ink dots partially overlapped.

When multiple ink sets are used, the dot array patterns excluding those of level 1 not selected for at least one or more colors and masks arranged to record adjacent dots in different scans are applied.

Figure 16:
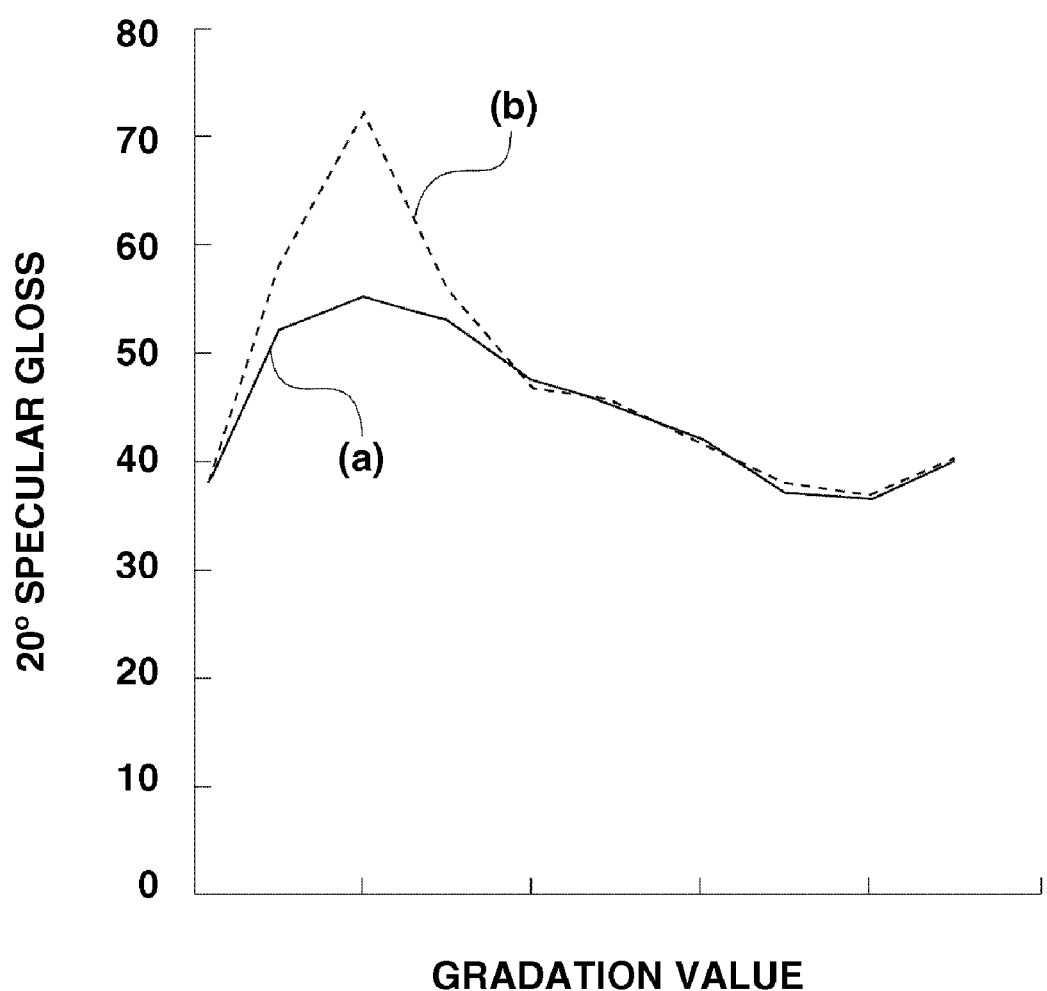
FIG. 16 is a graph illustrating 20° specular gloss of recorded images in the third exemplary embodiment.

FIG. 16 is a graph illustrating measurement results of the 20° specular gloss of a recorded product made by a similar method, a similar ink set, and a glossy paper medium to those in the first exemplary embodiment. The line (a) in FIG. 16, according to the present exemplary embodiment, indicates measurement results of the 20° specular gloss obtained when the dot array patterns, in which level 1 is not selected, are applied to Pgy ink with the lowest color material density, and the dot array patterns in FIG. 6 are applied to K and Gy colors. The line (b) in FIG. 16 indicates measurement results of the 20° specular gloss when the dot array patterns in FIG. 6 are applied to all of the colors.

Compared with the line (b), the line (a) in FIG. 16 indicates that the 20° specular gloss in the low gradation section is restrained so as to be almost at an equal level as the 20° specular gloss in the high gradation section. As a result, the gloss is made even and the irregularity due to differences in gloss is restrained.

Figure 17:
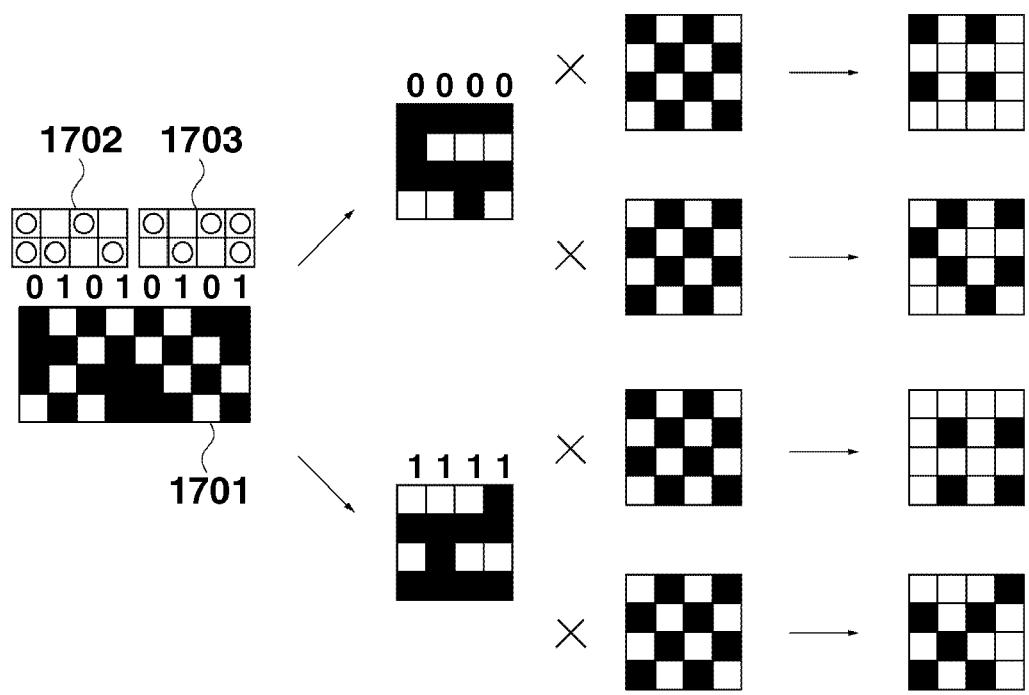
FIG. 17 is a schematic diagram illustrating column thinning-out recording.

The present exemplary embodiment can be realized by column thinning-out recording in each recording scan. FIG. 17 is a schematic diagram illustrating column thinning-out recording. Column thinning-out is a recording method to record by thinning out binary data arranged in the main scanning direction at predetermined intervals. FIG. 17 illustrates a case where data at every other column is recorded, and in the present exemplary embodiment, this method (two-column thinning-out) is used. A dot array pattern 1701 is formed when data of level 5 is input to 4 pixel areas of multi-valued data (8 pixels×4 pixels of binary data). 0 and 1 placed above the pattern 1701 are column numbers, and columns 0 and columns 1 are arranged alternately and are recorded in different recording scans. Dot patterns 1702 and 1703 are a group of columns 0 and a group of columns 1, respectively. As dots are thinned out from two columns, in the above-mentioned adjacent two pixels, dots are recorded in different scanning operations. The dots are recorded adjacent to each other on a glossy paper recording medium, so that the dots are arranged partially overlapped.

In the present exemplary embodiment, since ink dots adjacent in the sub scanning direction are recorded by different scanning operations, the ink dots are deposited in an overlapped manner on a recording medium, and the dots are not leveled to produce a uniform surface. Therefore, the surface undulations are promoted, and the gloss can be suppressed. In the present exemplary embodiment, the ink dots adjacent in the sub scanning direction are recorded by different scanning operations, but the present invention is not limited to this method, and the above-described control may be performed in the main scanning direction. When a plurality of types of ink is used for recording, the above-described control may be used for the gloss of a particular color.

In the exemplary embodiments described above, ink dots are applied based on level 1 as a threshold value, but the present invention is not limited to this method. More specifically, in the case of first gradation information (level 1) representing the lowest density, ink droplets are applied to the same position in a pixel area in an overlapped manner. In the case of second gradation information (level 5, for example) representing density information higher than the first gradation information, ink droplets are applied to different positions. In third gradation information (level 2, for example) representing density between the first gradation information and the second gradation information, ink droplets may be applied to the same position or may be applied to different positions.

In the exemplary embodiments described above, a case where the pre-stage processing J002, the post-stage processing J003, the γ correction processing J004, the quantization (halftoning) processing J005, and the print data generation processing J006 are performed by the host apparatus 3000, and the dot array patterning processing J007 and the mask processing J008 are performed by the recording apparatus (printer) 3004 has been discussed. The present invention is not limited to these schemes of operation. For example, a part of the processing items J0002 to J0005 may be executed by the recording apparatus 3004. All items of the processing items may be executed by the host apparatus 3000. Alternatively, the processing items J0002 to J0008 may be executed by the recording apparatus 3004.

A software program that implements the functions of the above-described exemplary embodiments can be supplied directly or remotely from an external device to a system or apparatus. The functions of the present invention can be implemented as a compute of the system or apparatus reads and executes the program code supplied. In the above-described exemplary embodiments, the program corresponding to the flowchart illustrated in FIG. 5 is included.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-142537 filed Jun. 15, 2009, which is hereby incorporated by reference herein in its entirety.

What is claimed is:

1. An apparatus for generating data used to apply a number of ink droplets corresponding to gradation information onto a pixel area on a recording medium with a recording head, the apparatus comprising:
a generation unit configured to generate data used to apply ink droplets in an overlapped manner to a same position in the pixel area when the gradation information is first gradation information representing a lowest density to apply ink droplets, and to generate data used to apply ink droplets to different positions in the pixel area when the gradation information is second gradation information representing a density higher than the lowest density.

2. The apparatus according to claim 1, wherein the generation unit generates data used to apply ink droplets to different positions without applying ink droplets to a same position in the pixel area when the gradation information is the second gradation information.

3. The apparatus according to claim 1, wherein the generation unit generates data used to apply ink droplets in the overlapped manner to a same position in the pixel area or to apply one ink droplet to the pixel area when the gradation information is the first gradation information.

4. The apparatus according to claim 1, wherein the ink droplet is an ink droplet of an ink with the lowest density out of a plurality of inks similar in color and different in color material density that can be applied with the recording head.

5. The apparatus according to claim 1, wherein the ink droplet is an ink droplet of pigment ink.

6. An apparatus for applying a number of ink droplets corresponding to gradation information onto a pixel area on a recording medium with a recording head, the apparatus comprising:
a control unit configured to control the recording head in such a way as to apply ink droplets in an overlapped manner to a same position in the pixel area when the gradation information is first gradation information representing a lowest density to apply ink droplets, and to generate data used to apply ink droplets to different positions in the pixel area when the gradation information is second gradation information representing a density higher than the lowest density.

7. A method for generating data used to apply a number of ink droplets corresponding to gradation information onto a pixel area on a recording medium with a recording head, the method comprising:
generating data used to apply ink droplets in an overlapped manner to a same position in the pixel area when the gradation information is first gradation information representing a lowest density to apply ink droplets, and to generate data used to apply ink droplets to different positions in the pixel area when the gradation information is second gradation information representing a density higher than the lowest density.

8. The method according to claim 7, wherein the generating generates data used to apply ink droplets to different positions without applying ink droplets to a same position in the pixel area when the gradation information is the second gradation information.

9. The method according to claim 7, wherein the generating generates data used to apply ink droplets in the overlapped manner to a same position in the pixel area or to apply one ink droplet to the pixel area when the gradation information is the first gradation information.

10. The method according to claim 7, wherein the ink droplet is an ink droplet of an ink with the lowest density out of a plurality of inks similar in color and different in color material density that can be applied with the recording head.

11. The method according to claim 7, wherein the ink droplet is an ink droplet of pigment ink.

* * * * *